United States Patent
Ingham et al.

(10) Patent No.: US 8,280,660 B2
(45) Date of Patent: Oct. 2, 2012

(54) ELECTRICAL DISTRIBUTION NETWORKS

(75) Inventors: Matthew Ingham, Derby (GB); David R. Trainer, Derby (GB); Stuart J. Galloway, Edinburgh (GB); Adam Dysko, Motherwell (GB)

(73) Assignee: Rolls-Royce PLC, London (GB)

( * ) Notice: Subject to any disclaimer, the term of this patent is extended or adjusted under 35 U.S.C. 154(b) by 544 days.

(21) Appl. No.: 12/309,608

(22) PCT Filed: Jul. 24, 2007

(86) PCT No.: PCT/GB2007/002812
§ 371 (c)(1),
(2), (4) Date: Jan. 23, 2009

(87) PCT Pub. No.: WO2008/023141

PCT Pub. Date: Feb. 28, 2008

(65) Prior Publication Data
US 2009/0292488 A1   Nov. 26, 2009

(30) Foreign Application Priority Data

Aug. 24, 2006   (GB) .................................. 0616746.4

(51) Int. Cl.
*G01R 19/00* (2006.01)
*G01R 31/08* (2006.01)

(52) U.S. Cl. ......................................... 702/64; 324/512

(58) Field of Classification Search .................... 702/64, 702/57–62, 65, 79, 81, 84, 108, 117, 182–185, 702/188–189; 322/11–12, 20, 27–29, 32, 322/34, 37, 44, 54; 323/234, 246, 274, 282–285, 323/299, 318; 324/76.11, 76.39, 149, 500, 324/512, 515, 522, 537–538, 600, 605, 609, 324/629–630; 361/1, 18, 20–21, 42, 52, 54–57, 361/60, 62–68, 79, 86–88, 90, 93.1
See application file for complete search history.

(56) References Cited

FOREIGN PATENT DOCUMENTS
WO   WO 96/33544 A1   10/1996
WO   WO 2005/002022 A1   1/2005

OTHER PUBLICATIONS

Foote et al., The Impact of Network Splitting on Fault Levels and Other Performance Measures, Jun. 6-9, 2005, 18th International Conference on Electricity Distribution, Turin, CIRED 2005, 5 pp.*
Senger et al., Automated Fault Location System for Primary Distribution Networks, Apr. 2005, IEEE Transactions on Power Delivery, vol. 20, No. 2, pp. 1332-1340.*
Anderson et al., "Contingency Fault Levels in the Electric Power Grid System of Botswana," AFRICON, IEEE, Capetown, South Africa, Sep. 28-Oct. 1, 1999, pp. 775-782.
Dilek et al., "Calculating Short-Circuit Currents in Distribution Systems Via Numerically Computed Thevenin Equivalents," IEEE, PES Transmission and Distribution Conference and Exposition, Dallas, Texas, USA, vol. 3, Sep. 7-12, 2003, pp. 984-990.

* cited by examiner

*Primary Examiner* — Toan M Le
(74) *Attorney, Agent, or Firm* — Oliff & Berridge, PLC

(57) ABSTRACT

Previously, electrical power systems have been analyzed to provide theoretical fault levels values for different zones of an electrical power distribution system based upon a worse case scenario. However, existing electrical loads will in practice provide a more adaptable and higher fault level. By monitoring and identifying an I-V characteristic upon switching electrical load in practical operation an actual default level at particular nodes in a power distribution system is determinable. In such circumstances decisions with regard to the connectability of further electrical generators or loads at particular parts and zones of an electrical power distribution system can be quantified by reference to the actual fault level rather than the theoretical worse case scenario level and therefore avoid unnecessary upgrading of transmission equipment or denying access to the electrical power system.

36 Claims, 3 Drawing Sheets

ELECTRICAL DISTRIBUTION NETWORKS

BACKGROUND

The present invention relates to electrical distribution networks and more particularly to electrical distribution networks which comprise a number of generators and electrical load elements in order to ensure desired operation.

It will be appreciated that electrical distribution networks typically comprise bus bars and grid cables connecting a number of electrical generator sources and electrical loads. Thus, network operators in order to achieve safe operation will determine minimum and maximum fault levels allowable in the electrical system. It will be appreciated each electrical power generator will provide a certain level of electrical current such that if there is a fault in terms of discharge to earth, the appropriate safety mechanisms must be sufficient to accommodate such a discharge surge.

Typically, electrical distribution network operators will determine fault current levels at various network locations by reviewing each electrical generator in terms of feed capability as well as other local sources of electrical power generation, the impedance between the electrical power generator sources and any potential fault and the impedance and nature of the potential faults themselves. The magnitude of determined electrical fault currents provides an electrical current setting for protection devices in rating of circuit breakers and other electrical current carrying equipment. Typically, in order to determine a fault current level on the network the following information is required:

a) network topography (status of all network switches)
b) prospective fault current contribution for all connected generators
c) in feed levels for higher voltage electrical distribution network connection points
d) in feed from devices such as induction motors which when switched off will contribute to electrical current for a time period and which is unpredictable in accordance with use of the respective motor.

With the above information a power system simulation exercise will be conducted in order to determine fault levels at all locations in the network.

SUMMARY

It will be appreciated from the above that determination of electrical fault levels acceptable within an electrical distribution network is a relatively complicated process. In such circumstances operators of electrical distribution networks tend to analyse their network periodically and publish minimum/maximum fault current levels at each connection such as a bus bar in the network. As a consequence of these calculated values associated equipment such as switch gear, transformers, circuit breakers and other current carrying equipment are rated for suitability relative to the established minimum/maximum fault current levels. In such circumstances when there is a new request for connection to an electrical power distribution network, the operator of that network will review the request against minimum/maximum fault current levels determined by the above analysis. Clearly, if the accepted calculated minimum/maximum fault current levels are exceeded then the operator will specify that it will be necessary to upgrade equipment such as described above in terms of switch gear, transformers etc. Such upgrading will generally incur significant costs and therefore either the potential connector to a network and/or the operator of the network will not wish to incur such costs. In such circumstances minimum/maximum fault current levels are a significant barrier to increased operation by additional connection of discretionary generators. These discretionary generators may include sources of renewable energy such as wind turbines which can only sporadically provide certain levels of electrical power generation or operators of electrical generators at a site, such as a factory, who may wish at times of low demand in their own facility to supply electrical power to the electrical power distribution network. The alternative of providing open points in the electrical power distribution system, that is to say limiting network size by switching and segmenting that network so reducing the fault level also cause problems. It will be appreciated if generators are restricted in terms of the contribution to the whole network then there may be problems with regard to providing alternative routes of electrical supply to all connectees to the network as well as in such terms compromising system security.

In accordance with aspects of the present invention there is provided a method of operating an electrical distribution network having at least one electrical power generator comprising:

a) defining a node within a respective zone of the electrical distribution network,
b) determining an I-V characteristic at the node over an electrical load change; and
c) utilising the I-V characteristics to determine a fault level for the zone of the electrical distribution network.

Possibly, the I-V characteristic is periodically determined for a subsequent operational time period. Alternatively, the I-V characteristic is substantially dynamically determined.

Possibly, at least one node is at a connection for the electrical power generator to the network.

Generally, the method includes an adjustment step to alter the network and/or generator dependent upon the fault level determined. Possibly, the adjustment step includes altering connections in the network. Additionally, the adjustment step may include switching off or disconnecting or de-rating the electrical generator.

Possibly, the zone defined by the electrical distribution network may comprise an electrical bus bar. Possibly, at least one zone is determined which comprises an electrical bus bar not directly connected to the generator.

Possibly, the method includes providing an indicator of fault level. Typically, the indicator comprises an indication of the value of the fault level. Possibly, the indicator provides an indication of whether the fault level exceeds a desired value. Possibly the indicator provides an indication of whether the fault level exceeds a safe value.

Possibly, the indicator provides an indication of the fault level stability in terms of a time period for which the fault level has remained stable.

Also in accordance with the present invention there is provided a monitor for an electrical distribution network comprising a connector for coupling in use to a node within a zone of an electrical distribution network in use, and a sensor to determine an I-V characteristic for the node upon an electrical load change and a processor to receive the I-V characteristic and determine a fault level for the zone.

Typically, the monitor includes a timer. Possibly, the timer is arranged to periodically determine the I-V characteristic and so the fault level. Alternatively, the monitor is arranged to dynamically determine the I-V characteristic and so the fault level.

Additionally, in accordance with the present invention, there is provided an electrical power distribution network comprising a monitor as above and a plurality of generators and/or electrical connectors, the monitor connected within the network at a predetermined node for a zone of the electrical distribution network.

Typically, the network includes switches to alter the network and/or at least one generator dependent upon the fault level determined. Possibly, the switches act to adjust and alter connections in the network to change the fault level. Possibly, the switches act to disconnect at least one generator from the network to vary the fault level.

Advantageously, the network includes an adjuster mechanism to alter at least one generator in terms of output to change the fault level.

Generally, the zone comprises an electrical bus bar. Generally, the electrical distribution network incorporates a plurality of zones. Typically, at least one zone comprises an electrical bus bar not directly connected to a generator.

Possibly, the electrical power generator includes an electrical load change mechanism. Possibly, the electrical load change mechanism comprises adjusting the excitation level within an electrical power generator to vary its output and therefore alter the load within the network.

BRIEF DESCRIPTION OF THE DRAWINGS

Embodiments of the present invention will now be described by way of example only and with reference to the accompanying drawings in which:—

DETAILED DESCRIPTION OF EMBODIMENTS

It will be appreciated that normally calculated fault level value is dependent upon a worse case scenario with respect to a power distribution network. However, in operation such a worse case scenario is generally not the actual situation at any prevailing time period. For example, rather than all the electrical power generated passing through the breakdown fault it will be appreciated that within a particular zone or region of the network there will be existing load demands upon the network which will reduce the fault level requirement. The level of confidence with regard to deviation for the calculated and theoretical fault level and the actual operational fault level will build with experience and operational life. In such circumstances it would be advantageous to provide an online estimate of the fault "climate" level in the zone of network to enable proposed connectees to the network to confirm to the operator that their additional generating capacity or demand will not disturb practical operational safety of the network. Furthermore, such online estimation of fault current level will enable the connectee to assure the operator of a network that should a safe value for fault level be exceeded, their contribution to the network will be switched off or degraded appropriately to return within an acceptable operational parameter fault level. It will also be understood that a band may be created below this safe fault level value within which continued operation of the system may be acceptable for a short period of time and/or with an increased risk which may be acceptable to the operator in view of their experience with respect to the statistic possibility of future degradation in the fault level to a dangerous extent.

Figure 1:
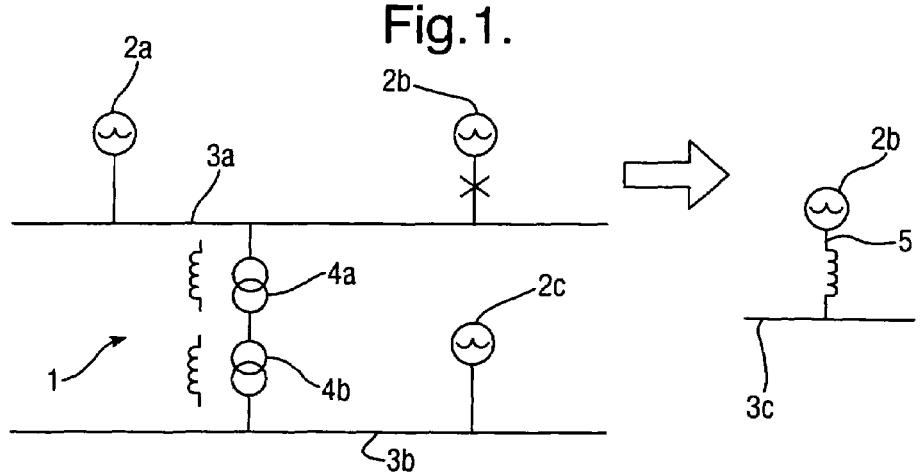
FIG. 1 is a schematic illustration of an electrical power distribution system in accordance with aspects of the present invention.

Aspects of the present invention utilise the assumption that a power distribution network behaves in certain zones as a linear electrical circuit and can be presented as an equivalent to that linear circuit. FIG. 1 provides a schematic illustration of a part of an electrical power distribution network 1 in which, as can be seen, a number of generators are coupled through electrical connections and bus bars 3a and 3b within the network. It will be noted that bus bar 3a and bus bar 3b may be coupled together through appropriate transformers 4a and 4b to provide electrical supply at different voltage levels. In short, it will be appreciated that the generators 2a, 2b and 2c provide electrical power and electrical loads (not shown) will utilise that power as required. It will be understood within the network 1 each generator can be schematically presented as generator 2b which has an effective impedance 5 as seen by the network through connectors/bus bar 3a. It is this consideration of this zonal part of the network as a linear circuit which enables online consideration in accordance with aspects of the present invention.

Figure 2:
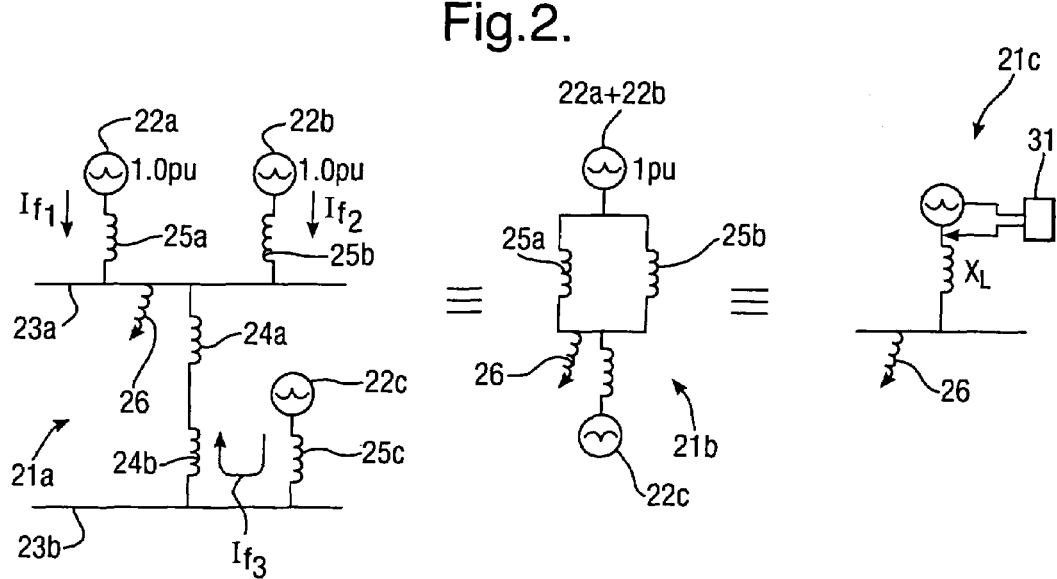
FIG. 2 is a schematic illustration of consideration of a zone on an electrical power distribution system as a linear electrical circuit.

FIG. 2 provides a schematic illustration of consideration of a linear electrical circuit in order to resolve the fault level in accordance with a monitoring process utilised in aspects of the present invention. Thus, networks 21a, 21b and 21c is substantially equivalent to network 1 depicted in FIG. 1. Thus, generators 22a, 22b and 22c each contribute to the networks 21a, 21b and 21c in order to provide electrical current through the network and in particular connectors/bus bars 23a and 23b. This arrangement is the equivalent to the situation depicted in network 21b such that an electrical fault 26 can be linearly analysed as a combination of the impedances 25a and 25b which in turn are the equivalent of the linear arrangement depicted as network 21c.

It will be appreciated that the generators are each considered to provide a unitary power unit PU so that the impedance load XL is the determinant factor with respect to fault level. The individual impedances 24, 25 are defined as a portion of the power force generator so that for example with the situation with a generator producing 1 PU at an impendence of 0.2 PU a fault level in unity of PU is created, that is to say 1÷0.2 or 5 PU. In such circumstances electrical switch gear etc., in the power distribution network can be specified in accordance with this fault level. However, should a further connectee such as a generator be added to the network, it will be understood that the equivalent impedance will then be substantially arranged in parallel such that the effective impedance is then much lower, for example if the additional connectee generator also has an impedance in the order of 0.2 PU then the load impedance XL is equivalent to 0.1 and a fault level of 10 PU is effective resulting in a requirement for different switchgear and transmission equipment in the distribution network. However, this is dependent upon consideration of a worse case scenario and generally the electrical distribution system will have existing loads which will draw electrical current and therefore the fault level value in the equation voltage×current÷fault value. It will also be understood that the situation above is exaggerated in that existing impedance will generally be less affected by adding just one further connectee generator or device.

The present invention determines the I-V characteristic of a particular node in the distribution network in order to establish through that I-V characteristic the actual fault level at a particular zone within the distribution network rather than the theoretical or calculated fault level based upon a worse case scenario. In such circumstances, by use of a method and meter in accordance with aspects of the present invention new connectees to add generators to a power distribution network can confirm that in reality their connection would not contribute too excessively to prevailing maximum current fault level limits within the distribution network. The method and monitoring meter in accordance with aspects of the present invention utilise determination of the fault level at a particular node within the power distribution network. This node will either be where the new connectee wishes to connect into the network through a bus bar, or a location within the network at which determination of the zones operational safety is required. It will be appreciated that the node will give an indication as to the practical fault level within the distribution network at that position and the fault level will result from a number of generators and electrical load elements associated with the distribution network around that node. It will be understood by creating a fault level value monitoring method in accordance with aspects of the present invention, that it is possible for the connectees to, as indicated, first show to a network operator that their additional contribution to the network will not disturb accepted operational values due to ongoing electrical loads provided by other elements or when a fault level is monitored which is above an accepted level provides at least an alarm, and if above a safe operating level will enable an indication to be provided that either the generator device should be disconnected or de-rated or other parts of the distribution system adjusted to ensure that the current fault level value is reduced below the safety limit. In such circumstances it should be possible to add additional connectees to the power distribution system without upgrading equipment unnecessarily. It will also be understood that by utilising the method and monitoring in accordance with aspects of the present invention existing power distribution systems may be analysed and the network operator able to reduce existing requirements with regard to equipment and installed equipment in view of the practical ongoing power level value rather than the previously theoretical calculated value based upon a worse case scenario with respect to fault conditions.

The present method and monitor arrangement will also enable power distribution network operators to establish parts and zones of that network which operate as hot spots, that is to say a lot of electrical power generation with limited impedance loading such that the fault level is high in that zone. Previously, such hot spot areas and zones of the network have been operated acceptably by using open points, that is to say limiting the number of supply pathways from generators within the network but such an arrangement, as indicated previously, will compromise security of supply and/or provision of alternative routes of supply for maintenance etc. In such circumstances removing such open points within the distribution network will improve overall system security.

Figure 3:
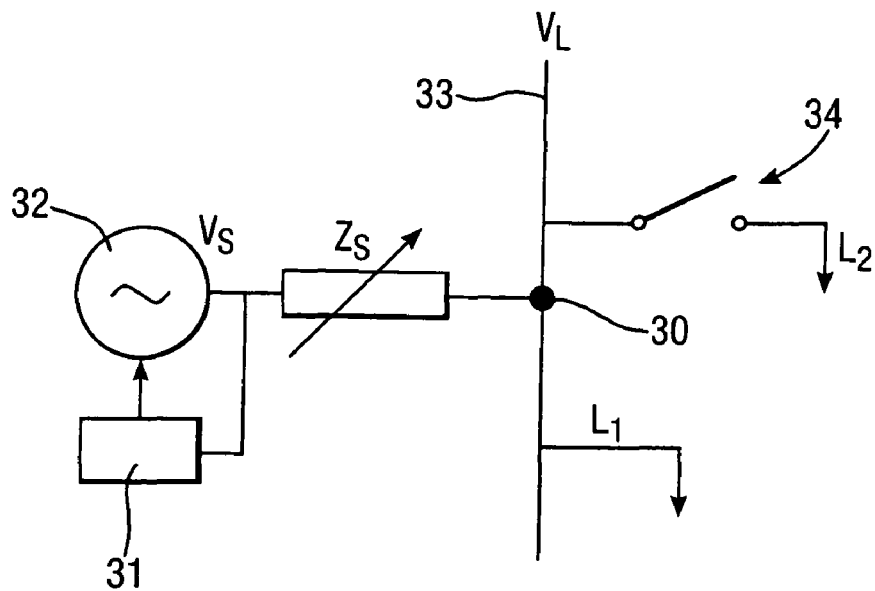
FIG. 3 is a schematic illustration of the analytical linear circuit consideration utilised in accordance with aspects of the present invention to determine an I-V characteristic under load change conditions.

FIG. 3 provides a schematic illustration of a monitor arrangement in accordance with aspects of the present invention. Thus, as previously, an electrical power generator 32 supplies electrical power to a power distribution network incorporating a connecter or bus bar 33. The arrangement is resolved as a linear circuit incorporating a system impedance $Z_s$. This value for the system impedance $Z_s$ is based upon an assumption that the power distribution network, as indicated, behaves as a linear electrical circuit and therefore can be representative as an equivalent circuit. In such circumstances this assumed linear electrical circuit will have an I-V characteristic at a particular node 30, that is to say where the generator 32 connects to the network through bus bar 33.

Under normal operating conditions load electrical currents impose a small voltage drop across the system impedance $Z_s$ resulting in a load voltage $V_L$ being slightly lower than the source voltage $V_s$ at the generator 32. This drop is as a result of any existing electrical load L1 on the system. Thus, there will be a further step change in electrical load current upon connection of a further large electrical load L2 causing a further transient drop in voltage which can be measured and gives an I-V characteristic as depicted in FIG. 4.

Figure 4:
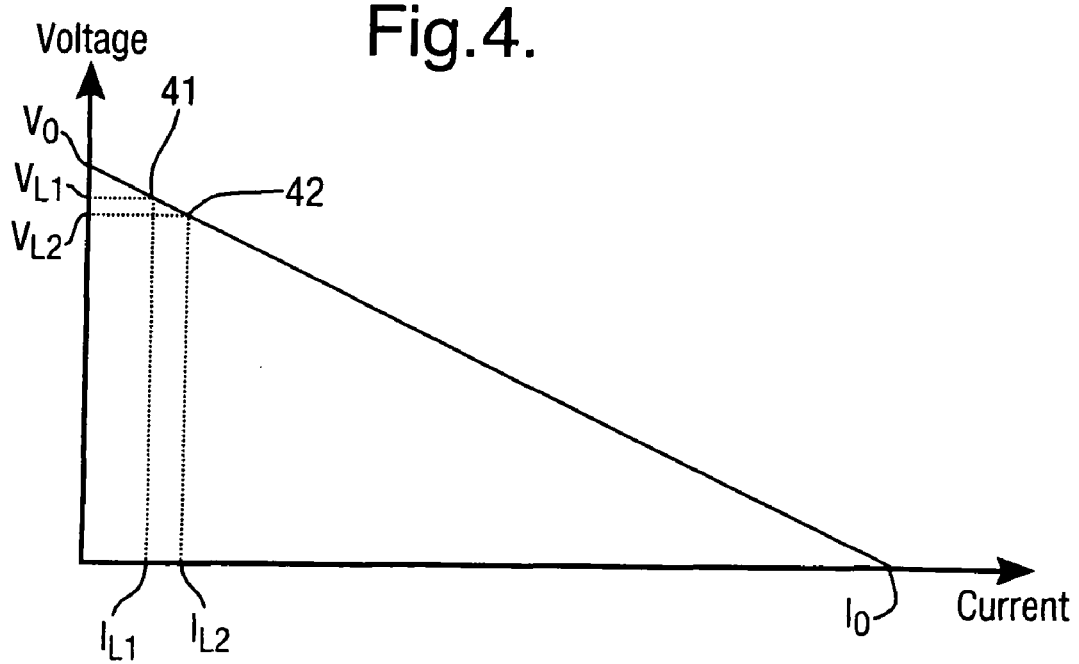
FIG. 4 is a graphic illustration of an I-V characteristic of a linear circuit.

Considering FIG. 4 it will be noted that $V_s$ is the theoretical voltage of the generator and therefore the voltage created by the generator when there is no electrical current flow. $V_{L1}$ is therefore equivalent to the voltage when an electrical load is applied and therefore electrical current $I_{L1}$ is drawn through the system. As can be seen, there is a drop between $V_S$ and $V_{L1}$ equivalent to that situation. When a large electrical load L2 is switched into the system a further drop in the voltage to $V_{L2}$ occurs when the electrical current drawn is $I_{L2}$. In such circumstances as can be seen an I-V characteristic between points 41, 42, that is to say respectively at the intersection of $V_{L1}/I_{L1}$ and $V_L/I_{L2}$ defines a gradient and through projection a characteristic over the full range of voltage to current determinable. Clearly, beyond a certain point for electrical current the voltage drop will be too significant to allow ongoing operation in that the system voltage will be below that acceptable. In such circumstances, as depicted in FIG. 2, the generator will typically incorporate an appropriate device 31 to adjust the generator in order to compensate for the voltage drop and therefore maintain voltage incorporating the bus bar 33. Nevertheless, this drop in voltage upon electrical load switching can be determined in order to create the I-V characteristic as described above which in turn can then be utilised to calculate the fault level for a zone of the electrical distribution system incorporating the node 30.

To summarise, upon switching a large electrical load L2 into the system as depicted in FIG. 3 the voltage before an electrical circuit breaker 34 closes is $V_{L1}$ and the corresponding load current $I_{L1}$. After the load L2 is switched into the system current increases to $I_{L2}$ and the voltage drops to $V_{L2}$ correspondingly. This event gives us two operating points $V_{L1}, I_{L1}$ (41) and $V_{L2}, I_{L2}$ (42) which can be used to calculate the parameters of the linear I-V characteristic depicted in FIG. 4.

Figure 5:
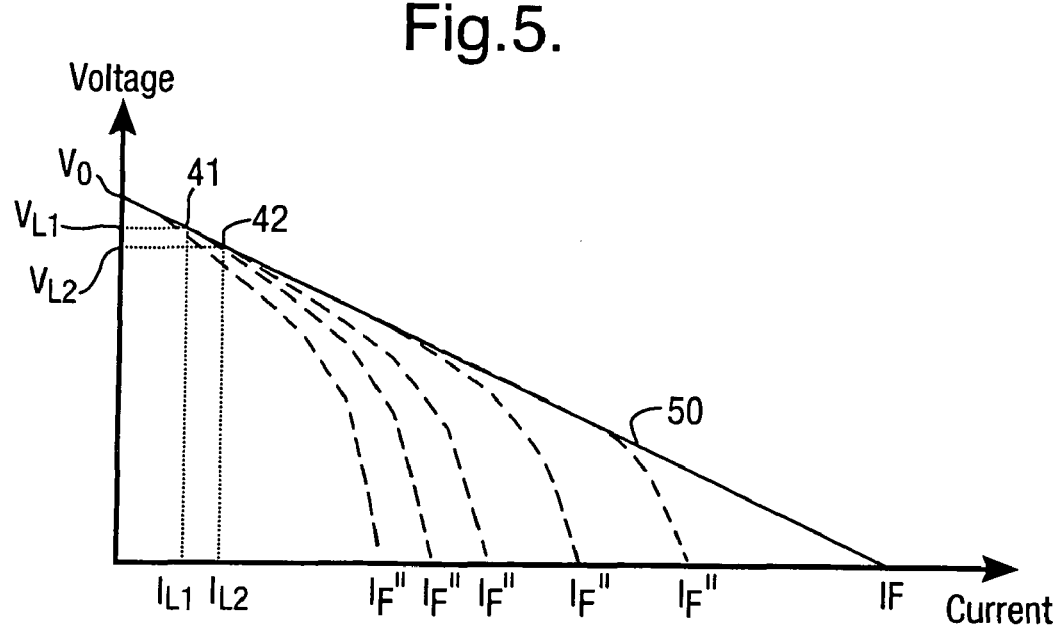
FIG. 5 is a schematic illustration of an I-V characteristic with non linear curves; and, FIG. 6 is a schematic illustration of one possibility with respect to creating differing electrical generator excitation in order to stimulate a load change for determining an I-V characteristic.

In real power systems a number of small load changes usually occur transiently or variably at the point of connection which will provide more than two operating conditions. In such circumstances, a process algorithm such as least squares can be used to estimate the parameters on line. In such circumstances, a non linear curve will typically be a more practical presentation of an I-V characteristic. In such circumstances each node 30 will over a period of time generate a non linear I-V response as depicted in FIG. 5. These non linear curves, as indicated, are practical in the sense within a large electrical power distribution system there will be a number of switching possibilities in terms of generators connecting and disconnecting from the electrical power distribution system as well as load demand from a variety of users. This will be theoretically averaged both generically and possibly in terms of such factors as time of day or seasonally between winter or summer electrical demand. In either case the I-V characteristic will still provide an adjustment which will allow the practical real fault level to be determined or estimated rather than previous arrangements where a worse case theoretical fault level was determined by analysis at the outset or when an additional connectee wished to be added to the network.

As depicted in FIG. 5 it can be seen that the idealised or linear I-V characteristic response curve is a straight line 50 whilst differing electrical load switching parameters create distortions to this I-V characteristic response. As indicated above, usually electrical generators within the system will be adjusted or an appropriate device or mechanism charged to compensate for the voltage drop in order to maintain that generators contribution and therefore maintenance of the voltage within the system.

The present method and monitoring arrangement provides a fault current estimation or provides a determination on a one to one basis with a generator at a single point of connection to the electrical network. This generator will be the additional connectees generator or where a review is conducted an existing distribution matrix where existing generators are connected to the electrical network. It will be appreciated that some generators may be connected or connectable to the electrical network at different positions in order to provide differing supply paths. Each one of these connection positions will be considered a single point of connection to determine the fault level for the generator under those particular conditions, thus, changes in network topography can be accommodated. The monitor and method is capable of taking local measurements in terms of the I-V response characteristic as described above at the points or nodes of connection. In such circumstances actual fault levels are determined at each node and therefore acceptability of additional connections within a zone associated with that node can be determined. In this situation the method and monitor in accordance with aspects of the present invention make it possible for local measurements at the nodes to be determined and through receiving instructions from a network operator or other control device decisions made with regard to either acceptability of connection or an offer of connection by a connecter upon the system to remain within acceptable safety and operational parameters. It will also be understood that bus bars which are not directly connected to a generator can have nodes which are utilised in order to determine I-V characteristics at that node and therefore acceptability in that part of the network for additional generators to be added to the system. Clearly, such additional generators may be added transiently to enable the effect at the node to be determined and then either acceptability for continued connection to a generator.

As indicated in FIG. 5, over a period of time a practical and possibly non linear curve of I-V characteristic response can be determined through switching of load behaviour within the network at a particular node. During this learning phase characteristic curves as shown in FIG. 5 can be determined for differing load switch and charge characteristics. It will be understood that relatively large loads in terms of electrical switching will be advantageous with regard to determining sufficient voltage drop to establish the I-V characteristic. These electrical load switchings may be inherent within the electrical power distribution system but may be over an unacceptably long period of time. In order to accelerate the learning process it may be possible to deliberately change the excitation of generators connected to the electrical power distribution system to provide a change in voltage which could cause a change in current and therefore create an I-V characteristic point on the respective curve which can then be utilised for determining the fault current level within the system.

Figure 6:
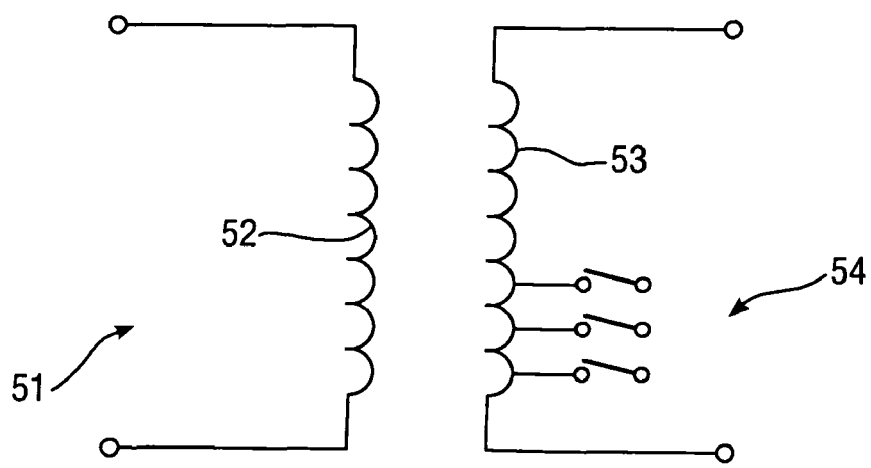

FIG. 6 illustrates a further alternative in which a transfer tap regime can be utilised in order to alter the voltage output. Thus, as can be seen, a typical transformer configuration 51 is provided in which a primary coil 52 excites a secondary coil 53. This secondary coil 53 provides the electrical voltage and current at a desired voltage. By use of taps 54 to the secondary coil 53 it will be appreciated in accordance with typical practice, different voltage outputs from the secondary coil 53 can be achieved. These taps 54 will generally already be provided in a transformer to take account of changes in demand.

It will be appreciated from above after the initial learning process with regard to creating the I-V characteristic curve as depicted in FIG. 5 in operational use a set of network conditions will be observed in terms of electrical power generator capacity, topography and electrical load and in such circumstances a fault current estimation device or monitor will determine the characteristic curve which best corresponds to monitored state and therefore provide an estimate of the prevailing fault current level.

Should the fault level exceed a desired value, it will be appreciated that a number of scenarios can be provided in terms of continued operation of the electrical distribution system. Firstly, if the acceptable fault level value is exceeded, an indicator alarm may be raised either immediately or after the fault level value is exceeded for a period of time. It will also be understood that a safe value for fault level may be determined which, if exceeded, will create an alarm and trigger an appropriate switch response in the network to reduce the fault level to below that safe value. Finally, it will also be understood that the indicator may show stability in terms of how long the fault level has remained stable.

By monitoring the fault level and knowledge through the learning stage of the practical electrical loading switched into the system, it may be possible to predict or accept short term transients above the accepted fault level for a period of time in view of the lack of likelihood of that condition persisting for a long period of time, the network may be allowed to continue at a fault level above that generally acceptable.

It will be appreciated that the method and monitor in accordance with aspects of the present invention may be arranged to periodically determine the fault level at different nodes within the network and then allow operation of the network dependent upon the fault levels for a period of time beyond that calibration stage. Nevertheless, it will be understood that periodically the method and monitor will need to recalibrate the fault levels at the nodes within the system and network in order to ensure desired behaviour within the network.

Alternatively, the method and monitor in accordance with aspects of the present invention may be configured to provide substantially dynamic constantly updated fault level values at the nodes within the system and network to ensure appropriate operation. It will be appreciated that this is substantially dynamic in that analysing the I-V characteristic will require a certain level of processing and this will inherently create an iterative generation of fault level rather than a continuous fault level value.

It will be understood that zones in accordance with aspects of the preset invention are defined within the network. Thus, a mini network may be created by a particular operator or owner by deploying open switching and monitors and operating a method in accordance with aspects of the present invention across their own generator and mini network and at connection points for that mini network to a wider distribution network. In such circumstances localised management of the mini network will allow better control at that level rather than depend upon a whole wider network control regime.

Aspects of the present invention may be utilised with regard to electrical power distribution system for distribution of electrical power from power stations or other generators but also could be used within confined networks utilised within an aircraft or marine applications to improve network reconfiguration and management/control/stability. With altering electrical power generators it will be understood that the inductance causes a phase shift and ideally operation should be performed at a 90° phase shift. Adjustment of the system through a monitoring method in accordance with aspects of the present invention will enable shifting of the phase shift to inductance nearer to an idealised 90° operational status.

The invention claimed is:

1. A method of operating an electrical distribution network having at least one electrical power generator, the method comprising:
   a) defining a node within a zone of the electrical distribution network;
   b) using a meter to measure voltage and current at the node to determine a Current-Voltage characteristic (I-V characteristic) at the node over an electrical load change; and
   c) utilising the I-V characteristic to determine a fault level for the zone of the electrical distribution network.

2. The method of claim 1, wherein the I-V characteristic is periodically determined for a subsequent operational time period.

3. The method of claim 1, wherein the I-V characteristic is substantially dynamically determined.

4. The method of claim 1, wherein at least the node is at a connection for the electrical power generator to the network.

5. The method of claim 1, the method further comprising:
   an adjustment step to alter at least one of the network and the generator depending on the fault level determined.

6. The method of claim 5, wherein the adjustment step includes altering connections in the network.

7. The method of claim 5, wherein the adjustment step includes switching off or disconnecting or de-rating the electrical generator.

8. The method of claim 1, wherein the zone of the electrical distribution network includes an electrical bus bar.

9. The method of claim 8, wherein the zone includes an electrical bus bar not directly connected to the generator.

10. The method of claim 1, the method further comprising: providing an indicator of fault level.

11. The method of claim 10, wherein the indicator includes an indication of the value of the fault level.

12. The method of claim 10, wherein the indicator provides an indication of whether the fault level exceeds a desired value.

13. The method of claim 10, wherein the indicator provides an indication of whether the fault level exceeds a safe value.

14. The method of claim 10, wherein the indicator provides an indication of the fault level stability in terms of a time period for which the fault level has remained stable.

15. The method of claim 1, wherein step b) includes measuring the voltage and current at the node before the load change to provide a first point on the I-V characteristic and measuring the voltage and current at the node after the load change to provide a second point on the I-V characteristic.

16. The method of claim 15, wherein step b) includes measuring the voltage and current at the node before and after each of a plurality of load changes to provide a plurality of points on the I-V characteristic.

17. The method of claim 15, wherein step b) includes connecting an electrical load to the node to produce a load change, measuring the voltage and current at the node before the electrical load is connected to the node to produce the load change to provide a first point on the I-V characteristic, and measuring the voltage and current at the node after the electrical load is connected to the node to produce the load change to provide a second point on the I-V characteristic.

18. The method of claim 17, wherein step b) includes measuring the voltage and current at the node before and after each of a plurality of electrical loads are connected to the node to produce a plurality of load changes to provide a plurality of points on the I-V characteristic.

19. The method of claim 1, wherein step b) includes changing the excitation of at least one electrical power generator connected to the electrical distribution network to provide a change in current.

20. A monitor for an electrical distribution network comprising:
    a connector for coupling in use to a node within a zone of an electrical distribution network;
    a sensor that is configured to measure the voltage and current at the node and to determine a Current-Voltage characteristic (I-V characteristic) for the node from the voltage and current upon an electrical load change; and
    a processor to receive the I-V characteristic and determine a fault level for the zone.

21. The monitor of claim 20, wherein the monitor includes a timer.

22. The monitor of claim 21, wherein the timer is configured to periodically determine the I-V characteristic and so the fault level.

23. The monitor of claim 20, wherein the monitor is configured to dynamically determine the I-V characteristic and so the fault level.

24. An electrical power distribution network comprising:
    the monitor of claim 20, and
    a plurality of generators and/or electrical connectors, wherein
    the monitor is connected within the network at a predetermined node for a zone of the electrical distribution network.

25. The network of claim 24, wherein the network includes switches to alter at least one of the network and one or more generators depending on the fault level determined.

26. The network of claim 25, wherein the switches are configured to adjust and alter connections in the network to change the fault level.

27. The network of claim 25, wherein the switches are configured to disconnect at least one generator from the network to vary the fault level.

28. The network of claim 24, wherein the network includes an adjuster mechanism that is configured to alter at least one generator in terms of output to change the fault level.

29. The network of claim 24, wherein the zone includes an electrical bus bar.

30. The network of claim 24, wherein the electrical distribution network includes a plurality of zones.

31. The network of claim 30, wherein at least one zone of the plurality of zones includes an electrical bus bar that is not directly connected to a generator.

32. The network of claim 24, wherein the electrical power generator includes an electrical load change mechanism.

33. The network of claim 32, wherein the electrical load change mechanism is configured to adjust the excitation level within an electrical power generator to vary its output and therefore alter the load within the network.

34. The monitor of claim 20, wherein the sensor is configured to measure the voltage and current at the node before the load change to provide a first point on the I-V characteristic and the sensor is configured to measure the voltage and current at the node after the load change to provide a second point on the I-V characteristic.

35. The monitor of claim 34, wherein the sensor is configured to measure the voltage and current at the node before and after each of a plurality of load changes to provide a plurality of points on the I-V characteristic.

36. A method of operating an electrical distribution network having at least one electrical power generator, the method comprising:

a) defining a node within a respective zone of the electrical distribution network,
b) using a meter to measure voltage and current at the node during normal operating conditions of the electrical distribution network to determine a Current-Voltage characteristic (I-V characteristic) at the node over a load change, and
c) utilising the I-V characteristic to determine a fault level for the zone of the electrical distribution network.

* * * * *